United States Patent [19]

Van Wormer

[11] Patent Number: 5,154,314

[45] Date of Patent: Oct. 13, 1992

[54] SYSTEM FOR TRANSPORT, DELIVERY AND DISPENSATION OF INDUSTRIAL LIQUID FLUIDS

[76] Inventor: Roger Van Wormer, 2958 S. Union St., Rochester, N.Y. 14624

[21] Appl. No.: 677,144

[22] Filed: Mar. 29, 1991

[51] Int. Cl.$^5$ .............................................. G06F 15/20
[52] U.S. Cl. ........................................ 222/1; 222/14;
222/608; 141/20; 141/231; 141/382; 235/94 R; 364/465
[58] Field of Search .................... 222/1, 14, 52, 67, 64, 222/71, 608, 626; 141/20, 231, 382; 364/403, 465, 510; 235/94 R, 94 A

[56] References Cited

U.S. PATENT DOCUMENTS

| | | | |
|---|---|---|---|
| 3,814,148 | 6/1974 | Wostl | 364/465 X |
| 3,976,227 | 8/1976 | Ray | 222/136 |
| 4,107,777 | 8/1978 | Pearson et al. | 364/465 |
| 4,247,899 | 1/1981 | Schiller et al. | 364/465 |
| 4,313,168 | 1/1982 | Stephens et al. | 364/465 |
| 4,475,665 | 10/1984 | Norton | 222/14 |
| 4,482,964 | 11/1984 | Berstein et al. | 364/465 |
| 4,553,573 | 11/1985 | McGarrah | 141/231 X |
| 4,611,205 | 9/1986 | Eglise | 364/465 X |
| 4,911,330 | 3/1990 | Vlaanderen et al. | 222/132 |
| 4,961,507 | 10/1990 | Higgins | 221/129 |
| 5,051,920 | 9/1991 | Reams et al. | 364/465 X |

Primary Examiner—Michael S. Huppert
Assistant Examiner—Gregory L. Huson
Attorney, Agent, or Firm—Schmeiser, Morelle & Watts

[57] ABSTRACT

A secure control system for delivery, dispensing and inventory of several liquid fluids (products). A stocked liquid delivery vehicle 100 provides coordinated and measured filling of liquids through a site dispensing subsystem 200 to site storage containers 302. The liquids from the storage containers are subsequently delivered under inventory control, and in measured amounts, back through the fill lines to the dispenser. The dispenser CPU records the amounts of each liquid dispensed to each user through various spouts 224. Users are identified by a code number entered into the dispenser unit via a keyboard 208 or card reader. The dispenser CPU 202 contains program information to identity authorized users of the system. The system respnds to user solicitation of liquids by verifying the user's identity, querying as to which liquid is desired, the amount desired (if variable) and enables a control switch/indicator 232 to indicate the dispensing port 224 and readiness. The system maintains an inventory estimate of the liquid level remaining in its container storage bank 300 and generates user/product reports on the storesusage, printing such data on a hard copy and/or relaying it, via power 204/telephone 600 modem, to the vehicle 100 or source of the products 400 (depot). The system can also be queried via telephone and its inventory information directed to remote centers for alternate usage.

9 Claims, 7 Drawing Sheets

SYSTEM FOR TRANSPORT, DELIVERY AND DISPENSATION OF INDUSTRIAL LIQUID FLUIDS

BACKGROUND OF THE INVENTION

1. Field of the Invention

This invention relates generally to the field of delivery and dispensing of various liquids used in industrial and commercial applications and, specifically, to dispensing, in the work place, controlled amounts of chemicals, foods, water, etc. which may be delivered in bulk, the consumption of which is usually in small, measured amounts. One significant benefit is that this system also impacts favorably the environmental protection field in that it eliminates the need and cost of the omnipresent disposable aerosol can, the cost of the aerosol propellant and the environmentally adverse pollutant character of propellent and/or used, disposable containers. By employing reusable containers, filling them to proper levels and pressurizing the containers with air, a useful adjunct is provided that eliminates the need for the aerosol disposable container and its attendant problems throughout several industries. The instant invention is therefore a system for upgrading and enhancing current industry delivery practices and provides a viable option for solid waste management.

2. Relevant Art Discussion

Industrial and commercial usage of liquids, particularly cleaning and maintenance products, has increased significantly in recent years. Many users do not have effective inventory control means/methods over these products. The instant invention reduces the effective cost of the chemicals by removing a significant portion of the packaging and delivery cost of the product, as well as removing some of the storage costs of the product inventory. The system also provides an accurate, effective inventory of the product usage with no labor input from the end user or the small business employer. Further, because the system, under control of a single user, can dispense multiple chemicals simultaneously, and does not require efforts of another individual, the productivity of the discrete user is enhanced by minimizing his/her lost time awaiting supplies. Further, as EPA and OSHA requirements for control and monitoring of special product (i.e., products presenting health, environmental, etc. hazards) usage increase, this system will provide an effective means of supporting the user's record-keeping requirements. The invention has found initial acceptance in the automobile servicing market by cost-effectively supplying a variety of cleaning and maintenance liquids to automobile service centers. A concomitant benefit is that it also provides controlled access to the liquids; thus, the system is used to prevent pilferage and unauthorized use of the products from servicing/supply depot through the end user.

Several systems which appear to offer delivery, dispensing or inventory control (product) have been developed. For example, in recent U.S. Pat. No. 4,911,330, there is disclosed a SERVICE VEHICLE WITH DISPENSING SYSTEM (title). Therein, a service vehicle is disclosed in which a material dispensing system is mounted. The dispensing system includes reservoirs, pumps and plumbing necessary for pumping liquid fluids from within/out the reservoirs. Hydraulic motors operate the pumps and there is generally seen in this teaching an apparatus for servicing remotely located machinery and/or off the road vehicles. Although resembling a subsystem of the instant invention, the '330 is silent regarding means for controlled and inventory usage of fluids at a users facility. The instant inventor also avoids hydraulic pump usage.

U.S. Pat. No. 4,961,507 discloses a DISPENSING SYSTEM FOR HANDLING CONSUMABLE TOOLING AND SUPPLIES (title). The '507 teaching concerns a system for dispensing and tracking the use of a plurality of consumable items. The dispenser is provided with a supply of various items to be dispensed by arrangement in a selected pattern. Noteworthy in this disclosure is a program and memory means used to receive and identify data on the user of the machine and the item to be dispensed. The system responds to a request for an item by verifying the authority of the user, generating confirmation of the availability of the requested item and executing the dispensation of the requested item. Inventorying and control data are managed, generated on hard copy and evidence the trackability of the system relative to the dispensed items Delivery subsystems, as well as storage interface therewith are not disclosed.

A self-service gasoline station fuel delivery control and registration system is disclosed in U.S. Pat. No. 4,247,899, titled FUEL DELIVERY CONTROL AND REGISTRATION SYSTEM. Herein, there is disclosed a system having a central control unit with a display console, operating keyboard and a master microprocessor module. Separate slave microprocessor modules are employed for the various gasoline pumps for separately controlling the pumps and accumulating the amount of gasoline delivered. Interfacing with the master microprocessor module through a common slave bus means, the slave microprocessor modules furnish operational data regarding the liquid dispensed therefrom. The '899 patent, like the '507 patent is silent as to the methods of delivery and bulk storage of the products. Further, there appears to be no device or control for assuring (particularly in the case of the '507 patent) that diverse liquid products are not mixed, either accidently or inadvertently, or whether these may be, with impunity.

An AIRLOGIC CONTROLLER AND METERING PUMP UNIT FOR AN APPARATUS FOR TRANSFERRING, PUMPING AND METERING LIQUID CHEMICALS (title) is provided, according to U.S. Pat. No. 4,475,665, which is designed for bulk storage, handling and transportation of liquid chemicals and for the safe, precise and metered delivery and transfer of liquid chemicals from a source of chemical bulk storage to a place of end use. Essentially, the aforesaid apparatus consists in a depot supply (bulk storage) for a discrete liquid product which is loaded on a palletized container or set of containers and delivered, generally on site, to a place of dispensation. As in previously discussed patents, the '665 disclosure appears to be a relatively simple and uncomplicated system for transferring some discrete chemical liquid from a bulk storage to a metering delivery means. The problems encountered with the mixing of diverse products is not addressed because the scope of the actual teaching appears limited to singular or discrete products. Further, metering of a particular liquid flow does not in and of itself rise to the level of safe, certain and controlled transfer, storage and dispensation as contemplated by the instant invention.

Other dispensing systems have been disclosed in the art such as U.S. Pat. No. 3,976,227 for a LIQUID CHEMICAL DISPENSING UNIT (title) and U.S. Pat. No. 4,107,777 for a DISPENSING SYSTEM (title). The former consists in a rollabout cart containing an upper and lower bank of pressure sealable storage tanks containing liquid chemicals. It is a dual-manifolded system which is used in conjunction with a gas pressure source for successively feeding chemical, on demand, to coupled sprayers until the last tank is exhausted. Aside from its dispensing capability, it bears no greater relevance to the instant invention than the previously discussed dispensing systems As to the latter, '777, it appears to be the predecessor of '899, discussed earlier. It is relevant in that, in addition to merely dispensing fuel at a self-service operation, the operator is afforded switch means for arming (enabling) dispensers for self-service operation and for actuating the system for displaying selective dispenser information. In relation to the instant invention, it shares at least the same deficiencies as the '899 disclosure.

The instant invention was developed primarily with a view toward removing the disposable aerosol spray can from the industrial lexicon. Disposable spray cans for lubricating and cleaning fluids have three major drawbacks:

1) cost of the disposable can, cost of the propellant and the cost of buying chemicals in small quantities;

2) the disposal of the spray can is a problem because there is usually some product left in the can owing to the fact that the tube communicating with the bottom of the can does not reach all of the product and/or the propellant is exhausted before the contents; and 3) some of the propellants used are noxious relative to the ecology.

Reusable spray cans filled from a bulk product supply, pressurized by air, eliminate all three of the above mentioned problems. Systems for providing a comprehensive process for acquiring the reusability facility are not disclosed in the art. The instant system fills an industry-wide need by providing complete facilities, from distributor to user, for transferring, dispensing, controlling and inventorying liquid products of practically any nature. The specific item of this invention which is designated to replace the disposable aerosol can is a portable, air-chargable container, such as is known in the art, having a top filler plug, a (compressed) air fitting and a valved discharge spout or fitting. In operation, the fill plug on the top of the container is first removed. The container is then placed under the proper fill tube of a dispenser of the invention, and a selected fill button is pressed or activated. The container is then filled to the proper (nominal two thirds) fill level. The fill plug is replaced and standard shop air is used to pressurize the container via the compressed air fitting.

Should the container become exhausted of propellant (air) before the product is completely used, the user may recharge it with compressed air. Thus, the container may be used until the product is actually exhausted, and then replenished. As the hereinafter SUMMARY OF THE INVENTION shall disclose, the instant inventor has provided a complete system for supporting the use of a similar portable, air-chargable container which will, at least within the industrial commercial context, eliminate the need for the aerosol can.

SUMMARY OF THE INVENTION

Three major subsystems form the system of the instant invention: the delivery vehicle which transports liquid product from the depot or distribution source; the site storage bank, a series of containers at the user's facility; and, the site dispenser, also at the user's facility. Further, the site dispenser provides an integral interface between the delivery subsystem and the storage bank subsystem. The aforementioned subsystems are managed through a reliable transfer-dispenser inventory and control network which utilizes either vehicle or source/user electric or electric/air supplies, respectively. Upload of liquids to a vehicle is executed by air-driven pumps and predicated upon the user's requirements which have been solicited from the depot by the user's facility through a standard modem unit to the source or depot office computer or vice versa. During the upload function, controlled inventory is made through the vehicle onboard (O/B) computer and these data are ultimately transferred to hardcopy by the O/B printer. When the delivery vehicle arrives at the user's facility, transfer is generally made directly to the site storage bank through a computer central processer unit (CPU)—controlled site dispenser. The purpose of the bank is to hold the liquids in bulk until they are transferred, upon user request, back through the site dispenser.

During the product transfer to the user's facility (site), the vehicle O/B computer and site dispenser central processing unit (CPU) communicate and a coordinated, controlled transfer-receipt is effected. A safety overflow unit, associated with every discrete site storage container, is constantly monitored for overflow conditions and transfer pump shutdown may be commanded through the dispenser CPU, if necessary.

Once sites stores are filled/replenished, the using personnel may dispense (stored) products through the site dispenser. The dispenser subsystem contains several salient components including: a CPU or computer; computer peripherals including a printer(s); a power line modem and a telephone modem for communication with source or other central office computers. Through an automated/automatic identification and solicitation routine, operated through the dispenser CPU, a user identifies him/herself, indicates fill requirements of one or more of the previously described portable containers, fills the portable container(s) under regulation and inventory control of the dispenser CPU and departs to air pressurize, as required, the portable container for on-site usage. Meanwhile, data relating to the dispensation of liquid product are recorded for future usage, as well as presented on hard copy for review by control and management personnel.

The plural advantages gained through use of this novel combination of functions and equipment are: affording delivery of bulk product, not cans or drums, thus eliminating the need for aerosols and thereby further eliminating problems of multiple depleted container and waste product disposal; keeping track of who used what product, and how much; tracking, allowing the customer to maintain user exposure records (in the event of worker's compensation claims or lawsuits); and, minimizing or eliminating theft of easily ported aerosol can products.

DETAILED DESCRIPTION OF THE PREFERRED EMBODIMENT

A functional description of the instant invention will disclose it most clearly. The description, therefore, begins at the supply or source depot 400 (NOTE: 400 prefix for depot facilities) of the liquid products to be transferred and ultimately, dispensed. Numerology is consistent and referenced to the three subsystems of the invention.

Delivery Vehicle 100

Figure 1:
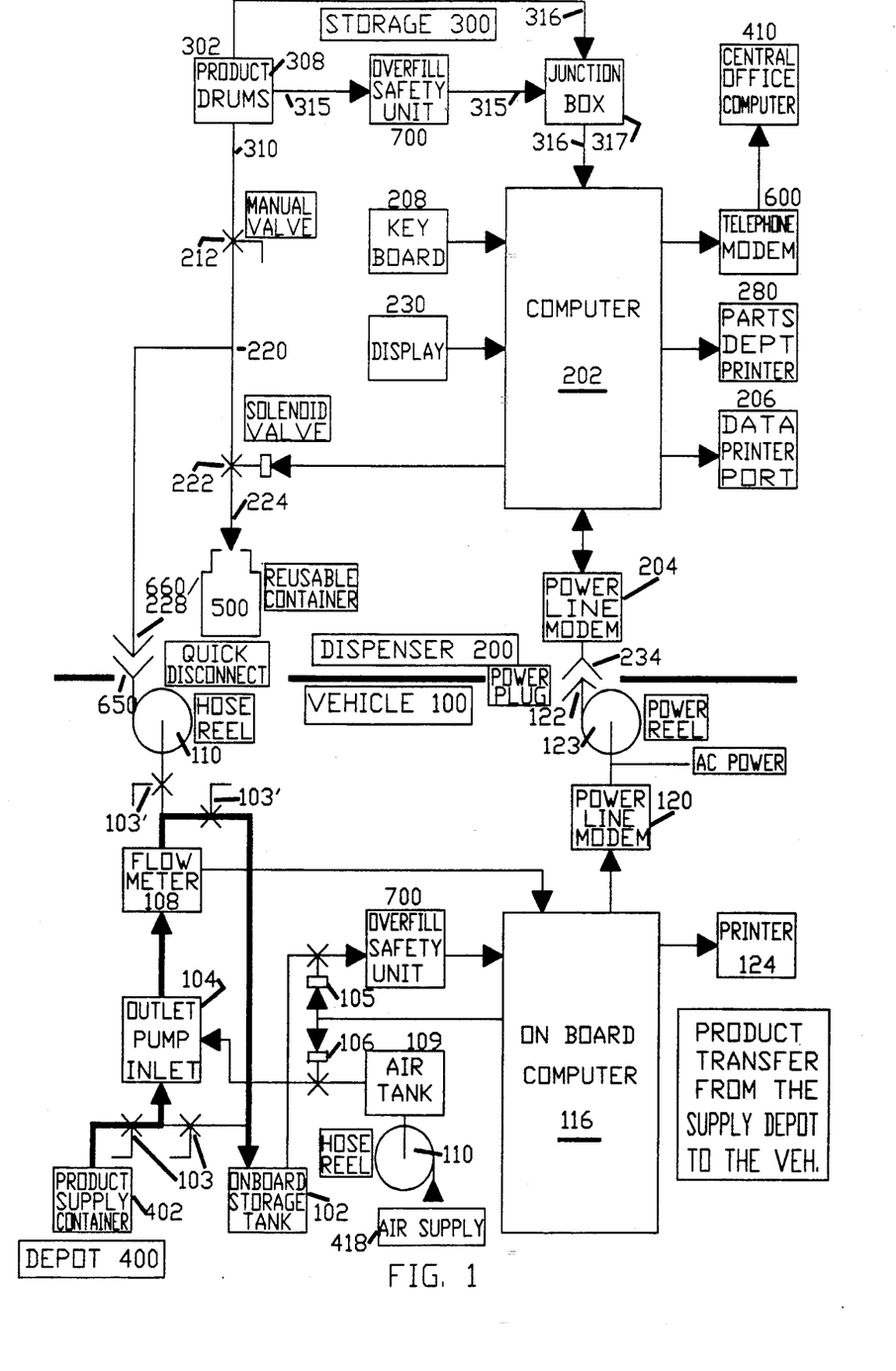
FIG. 1 is a flow chart relating to product transfer from supply depot to the transport vehicle.

The vehicle 100 is uploaded (containers filled) at the source depot 400. Each product is directed into its on-board (O/B) storage tanks as depicted by the heavy flow line. The vehicle proceeds to the customer facility (site) and refills the customer's site storage container bank 300. Minimum delivery time at the customer location is an important objective. Referring more particularly to FIG. 1, there is depicted (schematically) the subsystems comprising the delivery vehicle 100 and subsystems at the customer (eventually, user) site, comprising site storage 300 and site dispenser 200, all associated with their salient component units.

The major components of the vehicle 100 are the storage tanks 102, air diaphragm pumps 104, control valves 106, flow meters 108, hose reels 110, and an onboard (O/B) computer 112 with printer 114.

The vehicle valve assembly includes two 2-way valves 103 on the suctions side of the pump 104 and two 2-way valves 103' (or one 3-way valve) on the discharge side of the pump down stream of the flow meter 108. Combinations of 2-way and 3-way valves may be readily made by those of ordinary skill to effect the functional transfers of the invention.

The two 2-way valves 103 allow the operator to choose between feeding the pump from its own O/B storage tank 102 or, through a quick disconnect, from an external source. The external source is usually provided by the supply depot 400 facility. A hose is connected to a quick disconnect on the vehicle to a product supply container 402 in the supply depot. From the discharge side of the pump 104, the liquid product passes through the flow meter 108 to the O/B storage tanks 102 or, alternatively, through the flow meter out through the hose reel/hose 110 to the storage drums 302 at the customer's location, during site delivery and replenishment.

Air diaphragm pumps 104' are used, preferably throughout the system, because of their high suction capability and ability to run empty without damage to the pump. Compressed air is provided by depot, on-board storage or customer facilities.

From a control panel (not shown) on the vehicle O/B computer 116, the operator selects the product/code number of the pump which is to be activated. Having selected the proper product pump, the operator engages the start PUSHBUTTON through which the computer 116 energizes the correct air solenoid 106, starting the desired air pump. Simultaneously, the computer energizes a pilot solenoid 105 in order to vent the O/B/ storage tank 102. The tank vent is normally kept closed except during upload or download of the vehicle. The resulting closed system prevents evaporation of the product or spillage should a vehicular accident occur. The maximum number of pumps that may be run simultaneously is limited only by the capacity of air supply 109, air tank 419, irrespective of whether the vehicle is being uploaded or downloaded with liquid product.

Two modes are reflected, during up/downloading of the vehicle at the O/B computer 116 face panel, a "pump run" mode and a "storage monitor" mode. The SELECT PUSHBUTTON at the computer allows the operator to chose between the aforementioned two modes while indicating the various pump-run/drum-fill status on a group of 16 light emitting diodes (LEDs) on the front panel.

While downloading to a customer's storage bank 300, the flow meters in each of the product lines sends electrical signals to the vehicle O/B computer 116 to record the amount of product being delivered. These flow data are also used to increment or decrement the vehicle's inventory records. The record of the quantity of product on board at any time is readily available as required by Department of Transportation (DOT) safety rules.

While uploading the vehicle 100 at the depot 400 (FIG. 1), a float switch (not shown) at the top of each of the O/B storage tanks 102 is used to signal the computer 116 when the tank is full, the computer then de-energizes that pump's air solenoid and shuts down the pump. When downloading from the vehicle to a customer storage tank 302, another subsystem, the dispenser 200 computer 202 sends serial data to the vehicle's computer 116 to indicate that a particular storage (product) drum 302 is full and the O/B computer stops the fill pump. Reference to both FIGS. 1, 2 and 3 is appropriate hereinafter.

The dispenser computer 202, immediately prior to filling, transmits the customer identification and storage drum size(s) to the vehicle O/B computer 116. The two computers, dispenser (202) and vehicle (116) are interconnected through power line modems 204 and 120, respectively. Power line linkage is through cable 122 running off line reel 123. The vehicle equipment 120-123 is also functional at the depot 400 when the vehicle uploads with product. After delivery of product at the customer's site, its name is printed out on a delivery report at the vehicle computer 116 data printer port 124. Drum size is seen as an important datum in this system since it is one of the factors used by the controlling computers to respond at emergency shutdown thresholds. Thus, should a level switch malfunction, the maximum product pumped would be the equivalent of that established in computer memory for the recipient drum. The delivery report comprises a customer copy which lists, at least, all the products that the customer consumes and how many units were delivered. A vehicle copy is also provided by the vehicle computer 116 which lists all of the products that the vehicle carries and how many units of each product were delivered to the customer's site, including a total number of units of any and all products delivered that same day.

Vehicle and Dispenser Interface Operation

Figure 2:
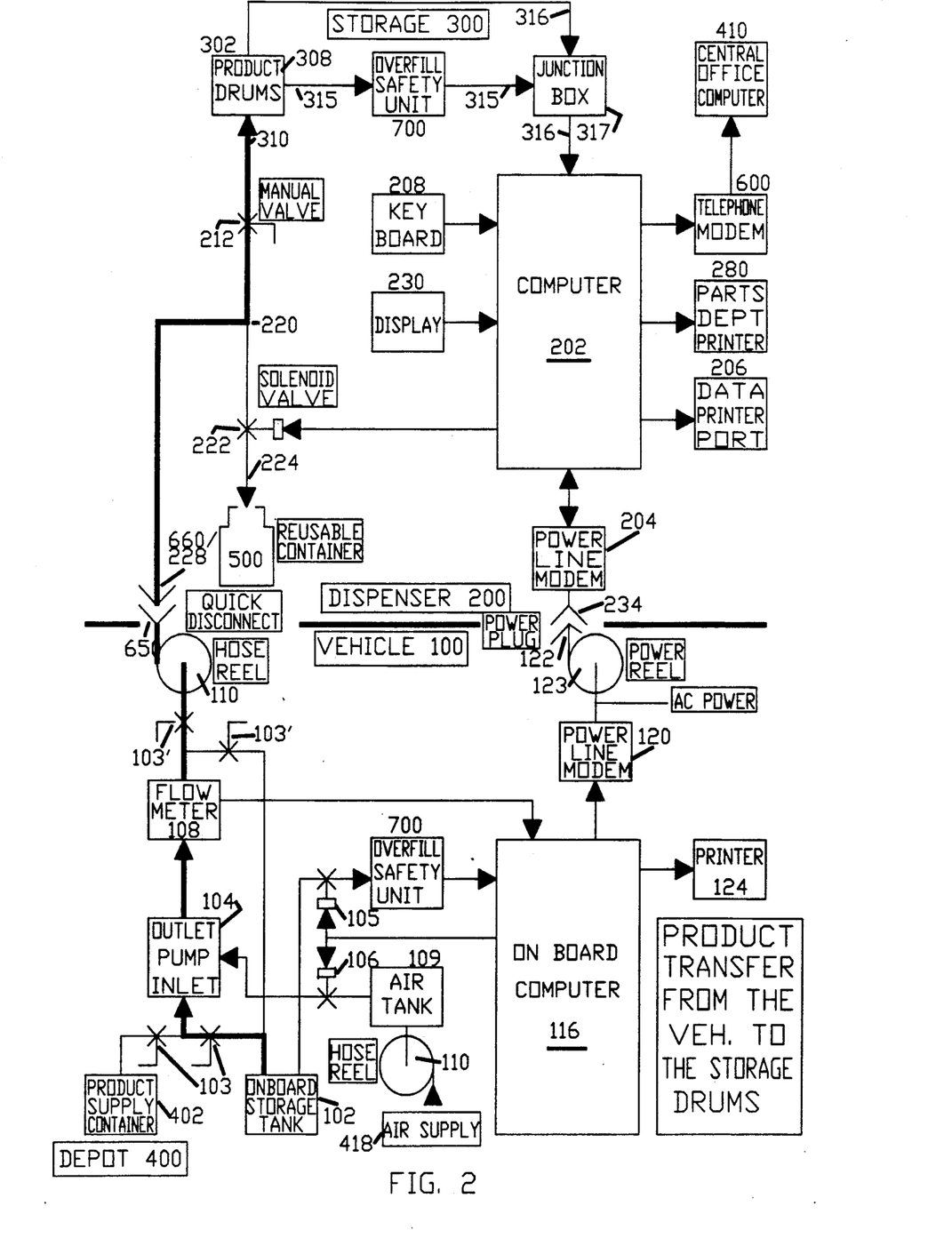
FIG. 2 is a flow chart relating to product transfer from the transfer vehicle to site storage (stores)
Figure 3:
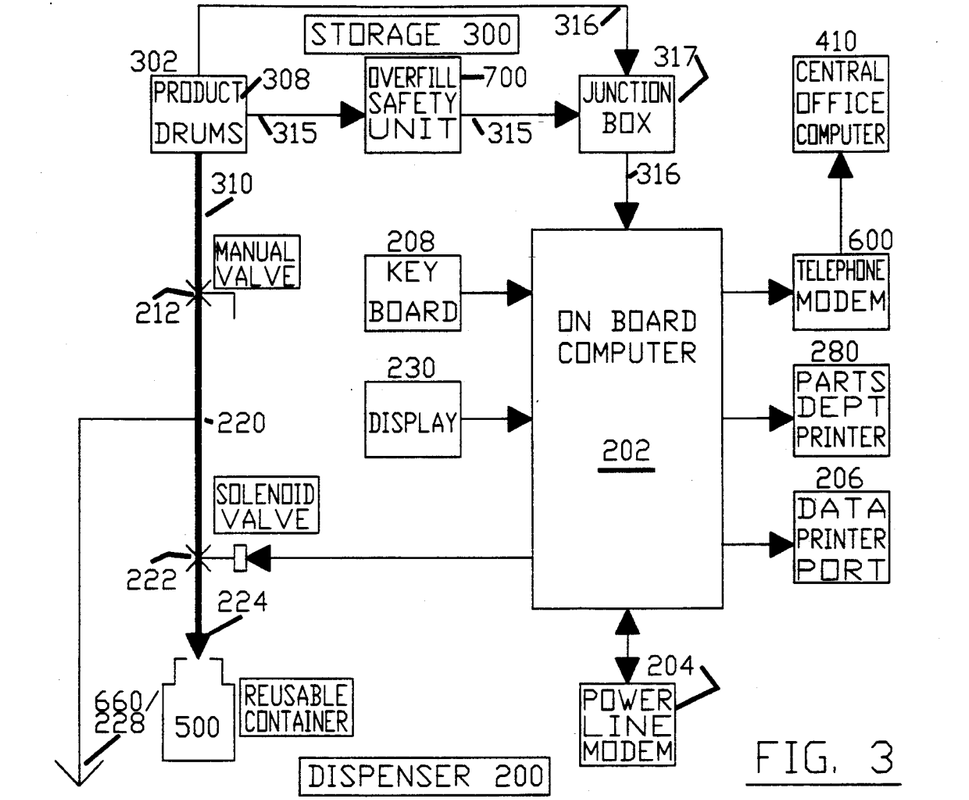
FIG. 3 is a flow chart relating to product flow from site storage to portable, reusable container(s)

Referring now with particularity to FIG. 2, the reader's attention is invited to the heavy flow line illustrated at the left hand side of the Figure. This flow line depicts the standard flow from the O/B storage tank 102 to the holding drums 302 at the dispenser site. Thus, when the vehicle arrives at the customer's site, the first two connections made are to the site shop air supply 218 for air pump energy, through air hose reel/hose 110, and from the vehicle power line 122 to the power/data connector (shown in FIG. 6A) on the side of the dispenser 200. The air supply provides air for pump operation while the power/data connection provides a 110 volts AC to the vehicle and a path for data communication between the vehicle O/B computer 116 and the dispenser computer 202. To commence the transfer operation, the operator sets the pump control valves 103/103' to the download positions. Product hose reels 110 are connected to the dispenser fill quick disconnects 228 at their proper input ports. A special quick disconnect coding schema is employed to prevent cross filling of products; it will be discussed more fully hereinafter.

The dispenser computer 202 provides the following data over the power line 122 to the vehicle computer 116: dealer name, site storage drum size (for the particular customer) and level data indicating the available maximum fill capacity of the various drums. Level data are provided continuously at a rate of several times per second so that when a drum reaches its proper fill level, the fill pump will be deenergized immediately. The operator enters the correct identification (ID) via the dispenser keyboard 208 to place the dispenser into the fill mode. The selected air pumps are then energized, as previously discussed, and product flows from the vehicle, through the dispenser quick disconnect and dispenser plumbing, up to a preselected elevation (for subsequent gravity feed) containing the customer's storage drums 302 which reside within, and comprise the major elements of the site storage subsystem 300. As each float switch 308 located within each discrete drum (implicitly shown in FIG. 5) is activated, an indication that the drum is full is transmitted to the dispenser computer and the corresponding pump is de-energized. Elements of the site storage subsystem will be discussed hereinafter, particularly at FIG. 5.

When all drums to be filled have received their products, the operator enters "fill complete" at the dispenser keyboard 208. The "quantity delivered" data are sent to the dispenser from the vehicle computer 116 in order to update the dispenser-storage drum inventory. If a particular drum has been filled to capacity, as indicated by "full" float switch level, the site inventory record for that product is reset to the normal drum capacity (15,30 or 55 gallon). If for some reason, the storage drum is not filled to capacity, the quantity delivered is added to the then-current site inventoried amount. The latter is an inventory maintained by the dispenser computer 202.

After delivery, the operator presses the print command on the vehicle's O/B computer 116, commanding it to print out the delivery record via printer 124. Two copies or more are printed, one remaining as the vehicle copy and another for the customer.

Site Storage Subsystem 300

Figure 5:
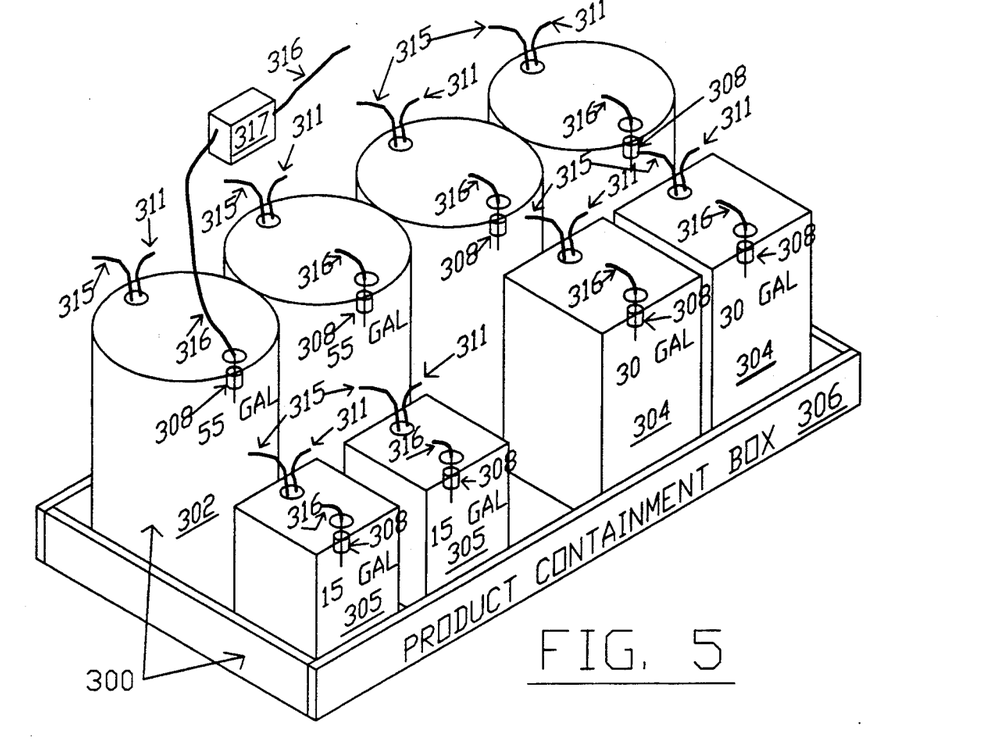
FIG. 5 is an illustration of site bulk storage container bank.

Referring to FIG. 5, the site storage drums 302 are sized in order to provide an ample supply of product for a complete month's usage, in 5-15-30-55 gallon sizes. The drums are held in a drum containment box 306 that is positioned at a location which is at least three feet above the top of the dispenser subsystem 200 in order to ensure proper head pressure for gravity feed dispensation.

The drums are mounted vertically with all openings at the tops of the drums. A supply tube 310 exits each drum and comprises a siphon feed line down to the manual shutoff valve 212 on the dispenser 200 below. Taking the product out through a connection at the top of the drum minimizes the probability of leaks.

As previously mentioned, a float switch 308 (not explicitly shown) is mounted in the top portion of each supply drum 302/304/305, having a normally closed contact (ncc) that opens when the drum is full. The ncc switch mode is used as a fail-safe device which would indicate a full drum in the event of a wire break. Thus, in the event of either a drum filling or wire/conductor break, transfer would cease immediately. The contact status of the float switch is transmitted through a cable 316 and junction box 317 to the dispenser control logic board (not shown) located in the dispenser.

Site Dispenser 200

The dispenser subsystem 200 is composed of plumbing connections that are made with the storage subsystem 300, the dispensing mechanism controls/indicators and a drip tray 226. The dispenser subsystem is set up to generally accommodate modular groups of four chemicals in each site unit. Generally, the dispenser units are wall mounted in groups of four, eight, sixteen, etc. chemicals. Site dispenser operation is now discussed with reference to FIG. 3.

The product flows from site storage subsystem 300 through the manual shut off valve 212 located at the top of the dispenser, through a line tee 220 to the electric solenoid valve 222 below the line tee. When the dispenser electrical logic (not shown) opens the solenoid valve 222, product will flow through the solenoid valve, through the discharge tube, 224 into the reusable container 500 placed in the drip tray 226. The fill nozzle length is designed to extend approximately one inch inside the neck of the portable container 500.

Figures 6A, 6B:
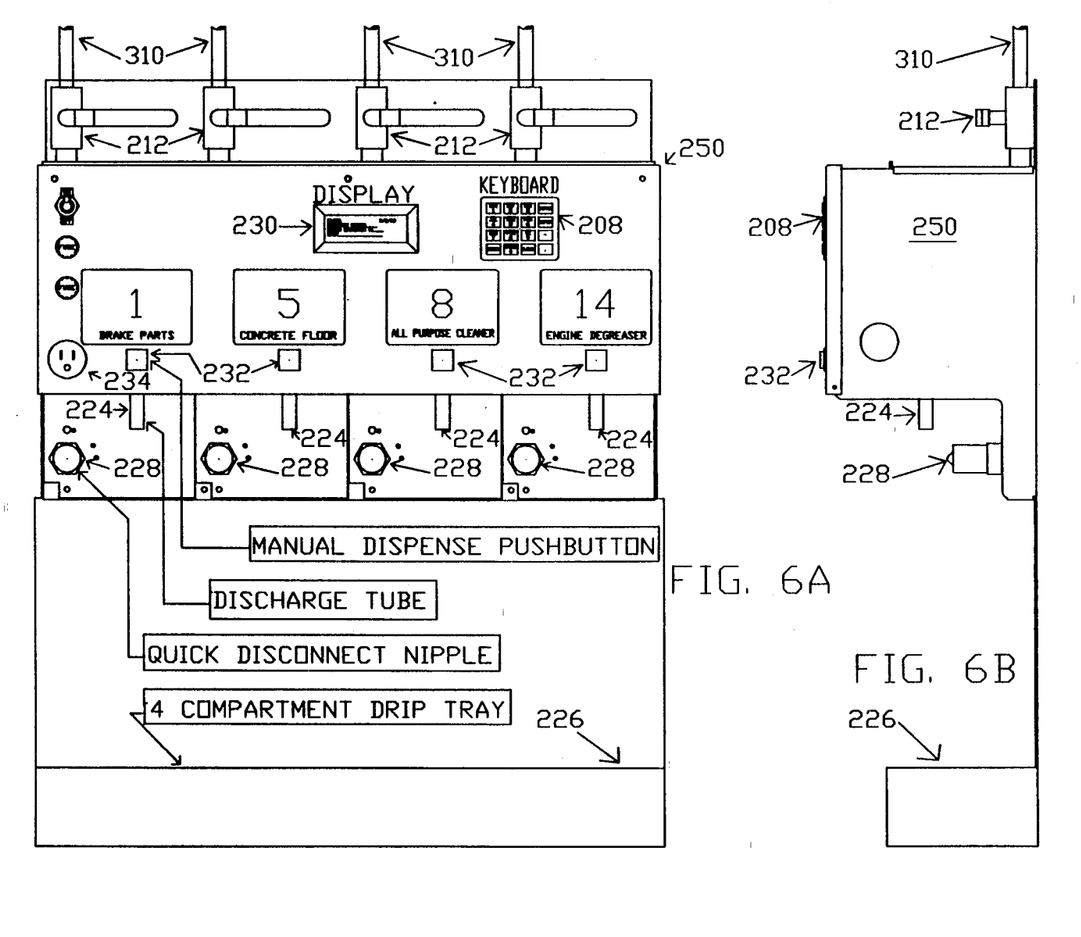
FIG. 6A and FIG. 6B are illustrations of a dispenser front panel and a side elevation thereof, respectively.

Reference now being made to FIGS. 6A and 6B, there is disclosed in the former a front panel 250 of a typical site dispenser 200. Discharge tubes 224 are seen proximate quick disconnect fill nipples 228. The drip tray 226 is positioned immediately therebelow, having a screen (not illustrated) thereover, which is designed for easy removal to make drip tray 226 individual catch buckets (not shown) easily accessible for periodic cleaning. Each product has an individual catch basin in order to preclude the mixing of (spilled) products. In addition to fluid control devices, this master control unit contains the central processing unit (CPU) board and the logic interface board which partially comprise the dispenser computer. Located on the face of the unit is a 4-line by 20-character display 230, a 16-key keypad 208, (or, alternately but not shown, is an intercom for communication with the parts department for otherwise identifying the user and controlling the computer/valve dispenser units) fuses and the power ON/OFF switch. Additionally, there are four lighted manual dispense enable push button switches 232, each located above a dispensing spout 224. At the left hand side of the dispenser face panel is the vehicle power/data connector 234.

During operation of the preferred embodiment, a user addresses the display 230 which indicates (for example):
10:45A Nov. 02, 1990
Dispenser Ready:
Enter Operator ID#
XXXX
The user enters a four digit ID number and the display responds with:
Operator Name:
—Operator's Name—
Enter Chemical #:XX
The user then enters a two digit chemical number and the display shows:
Dispense Chemical NN
—Chemical Name—
Cur Level:—.-gal
The manual dispense pushbutton for the desired product will now be lit (enabled). With the reusable container 500 under the discharge spout indicated by the lighted pushbutton, the user depresses the button, the corresponding electric solenoid valve opens and product is allowed to flow into the container to its nominal ⅞ level and is immediately shut off. If at any time the user desires to stop the fill process, he/she has but to release the pushbutton. The fill process may be restarted by simply pressing the pushbutton once again. The fill process will continue until the prescribed amount of product has been dispensed, determined by total time and flow rate of the product, as calculated by the dispenser computer 202. Calibration of the time/flow rate dispensation equipment is conducted at regular intervals to assure proper operation. This is done according to the various known calibration techniques that are used throughout the field.

A certain inventory logic is applied throughout the dispensation protocol. As the dispenser is activated, the events are recorded in the computer 200 electronic memory. The memory information is stored as follows:

1. Record of how much product is in each drum is updated by subtracting/adding to the drum 302 total each time a chemical is dispensed or delivered.

2. Record is maintained, as running totals, of each product used until the drum is refilled and the record reset to zero.

3. A record for each user is made showing the total quantity of each chemical used over a period of time. This datum is extremely important for the accumulation of user exposure data.

In the preceding DESCRIPTION OF THE PREFERRED EMBODIMENT, one alternative and other components or important auxiliary units have received but brief attention because a digression at their point of introduction would have detracted from the description of the overall system. Hereinafter, several of these units/components of a preferred status will be discussed with reference to remaining figures.

Telephone Modem Interface Unit 600

An alternate feature for modest installations is a simple telephone polling of depot customers to determine replenishment requirements. The present invention, however, goes far beyond this prototype delivery scheme and affords the customer a modern adjunct by use of a polling feature.

Each dispenser 200 has an interface for a telephone or modem 600 which can be connected to a telephone line at the customer's site. An internal clock of the dispenser CPU will allow the modem to answer the telephone after a predetermined number of rings or during non-business hours.

A central computer 410 at the depot business office 400 will call each customer periodically or upon command. If the site stores (product quantity) are low as determined by a site dispenser, a central computer 410 solicitation will be answered within another set number of rings, automatically. If no low levels are detected, then it will answer after yet another set number of rings. If a particular site dispenser is polled, and it is not low on any product, the central computer recognizes a "no-answer" within the first set number and moves on in its solicitation sequence. Thus, this modest polling routine saves a significant amount of telephone time for both customer and product supplier. The sequence comprises a form of partial computer interactivity not disclosed in the art.

Other routines, for the sake of expedience or economy, may also be employed. For example, one which allows the central computer 410 to force its way into the dispenser CPU by several algorithms known in the programming art. Having access to the discrete site dispenser subsystem allows product supply management to provide accurate and timely refill service. Management, using the special identification process within the system allows expedient monitoring of future needs as well as tracking overall consumption of specific products.

Job Number Printer/Parts Department Printer 280

Two or more job number printers 280 may be run off the dispenser computer 202 for the purposes of tracking product consumption by job number or for making various internal management decisions. Such facility, of course, allows charges to be directed to a particular job and others, of a differing nature, charged to general overhead costs. Most applications of the aforementioned nature are well known in the automobile repair and servicing field. It is noteworthy that this adjunct facility may be easily acquired through use of the instant invention.

Overfill Safety Unit 700

The reader's attention is drawn now to FIGS. 1-3 and 4A. Therein, reference is made to the overfill safety unit 700 which is an override unit used to stop all transfer pumps in the various subsystems during transfer operations. The units are located in the vehicle subsystem 100 and the storage subsystem 300 and are considered to be safety adjuncts, emergency devices, in the event any of the fill level float switches 308 fail during a storage drum filling operation.

Figure 4A:
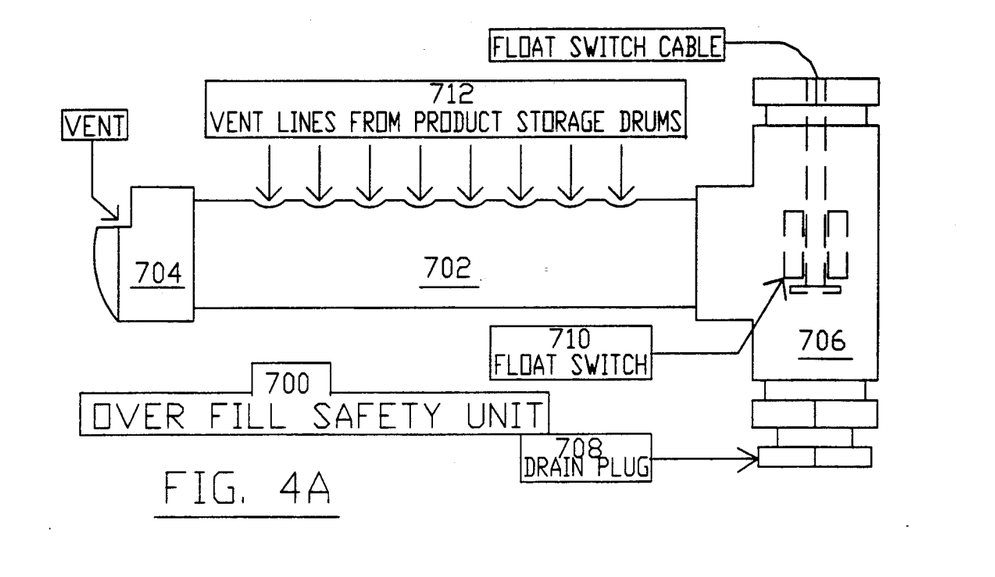
FIG. 4A is an illustration of an overfill safety unit of the invention.

The unit consists of a horizontal piece of tubing having a tee attached at one end and a plug disposed at the other. The bar forming the tee is therefore oriented vertically with its bottom fitted with a conventional drain plug. Referring more particularly now to FIG. 4A, the overfill safety unit 700 is depicted as the horizontally disposed tubing 702 fitted at one end with a vent plug 704 and the other with tee fitting 706 having at the bottom thereof a conventional drain plug 708. A float switch 710 is disposed inside the tee crossbar portion 706. Vent lines 310 from each of the storage drums 302 are inserted into holes 712 on the top edge of pipe 702. Should any drum overflow during the fill operation, product would immediately pass through its vent line and into the safety unit 700 tube 702 at an input port or hole 712. The relatively narrow tee crossbar would fill rapidly and actuate the float switch 710. Thus, an instantaneous signal to the dispenser, from the activated float switch 710, would cause the dispenser computer 202 to immediately signal the vehicle to stop all pumps. The filling operation cannot be recommenced until the overflow anomoly is removed or cleared. The same unit is also located aboard the vehicle for performing the same function with relation to the filling of O/B storage tanks 102 of the vehicle 100.

Quick Disconnect Hose Keying Feature 650/660

Figures 4B, 4C:
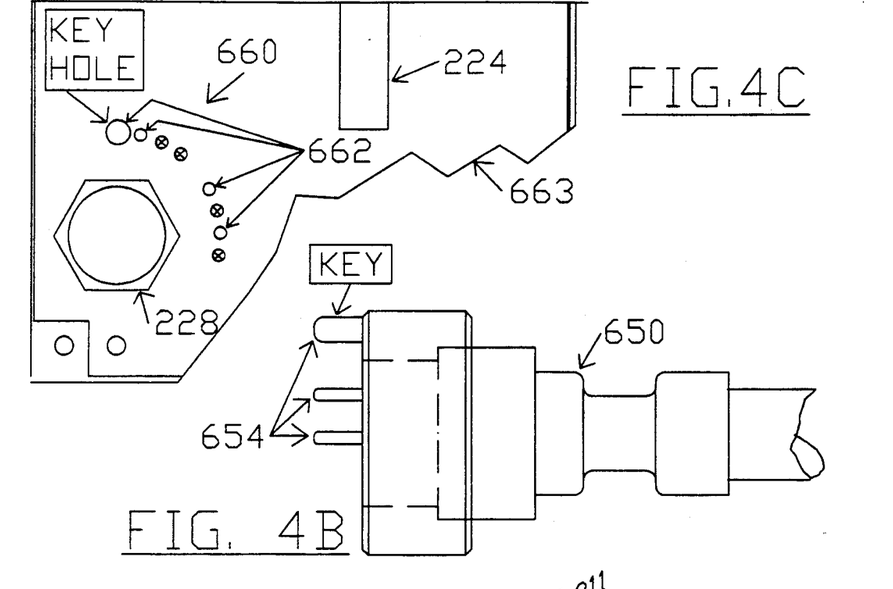
FIG. 4B and FIG. 4C are illustrations of female/male quick disconnect pin/hole scheme.

During the connection of the invention's hoses to the various input/output ports, quick disconnect fittings are employed. Referring to FIGS. 4B and 4C, the reader will notice a compatible female 650/male 660 disconnect pair. Since most hoses in the system that are used for filling product containers in drum storage are of the same diameter, it is extremely important to assure that the female quick disconnect on a hose providing fluid flow of one product is not inadvertently connected to a male fitting on a hose delivering product to a different storage drum. In the case of chemical product delivery, such cross contamination could result in dire consequences. Along the bottom of the dispenser system, as previously mentioned, is a series of male quick disconnects 228/660 which serve as feedpoints for filling the storage drums 302. The female quick disconnect 650, on the end of the supply hose, is plugged onto the male dispenser connector (nipple) 228/660. Since there are multiple dispenser systems and normally only one supply vehicle, the male connector was chosen for the dispenser and the female for the vehicle hoses because the male connectors are much smaller in size and about one quarter the price of the female connectors. The keying feature developed to prevent erroneous connections consists in a series of holes 662, arranged in a semi-circle around the mounting surface 663 of dispenser male connectors 660 with a concomitant series of pins 654 arranged about the perimeter of the adapter on the female connector 650 of the transfer hose. By use of this feature, in the invention's combination of three out of eight pins 654 and holes 662, a total of 20 different keying combinations is realized.

Alternate Transfer Vehicle (ATV) and Portable Dispensing Cart 800

Figure 7:
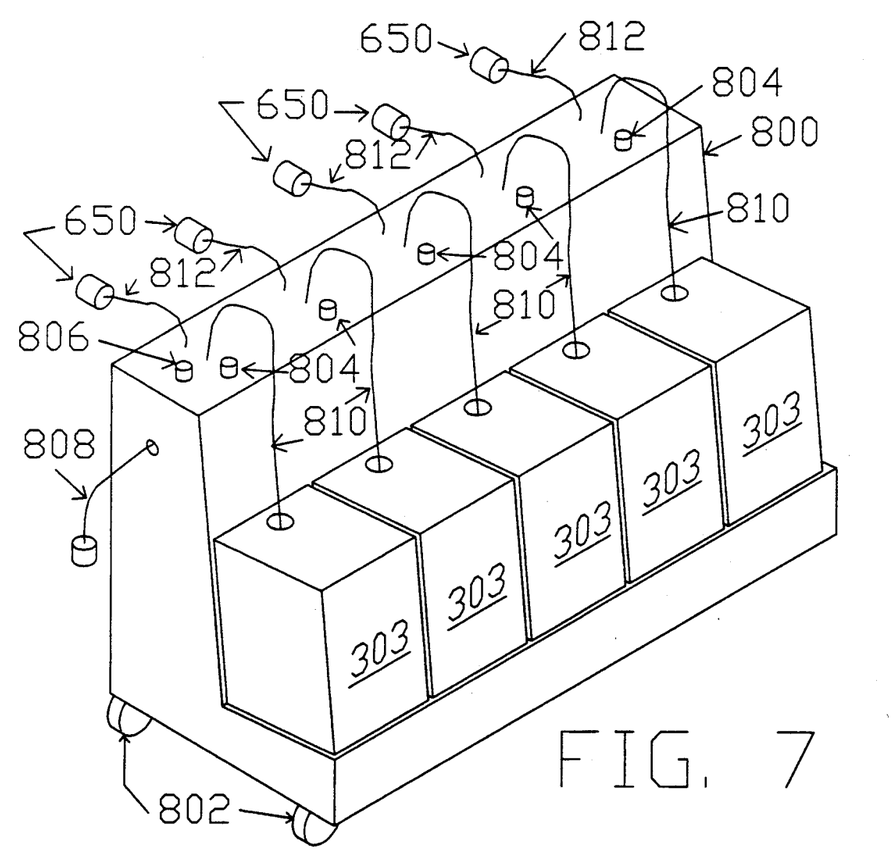
FIG. 7 is a portable product transfer cart of the invention.
Figure 8:
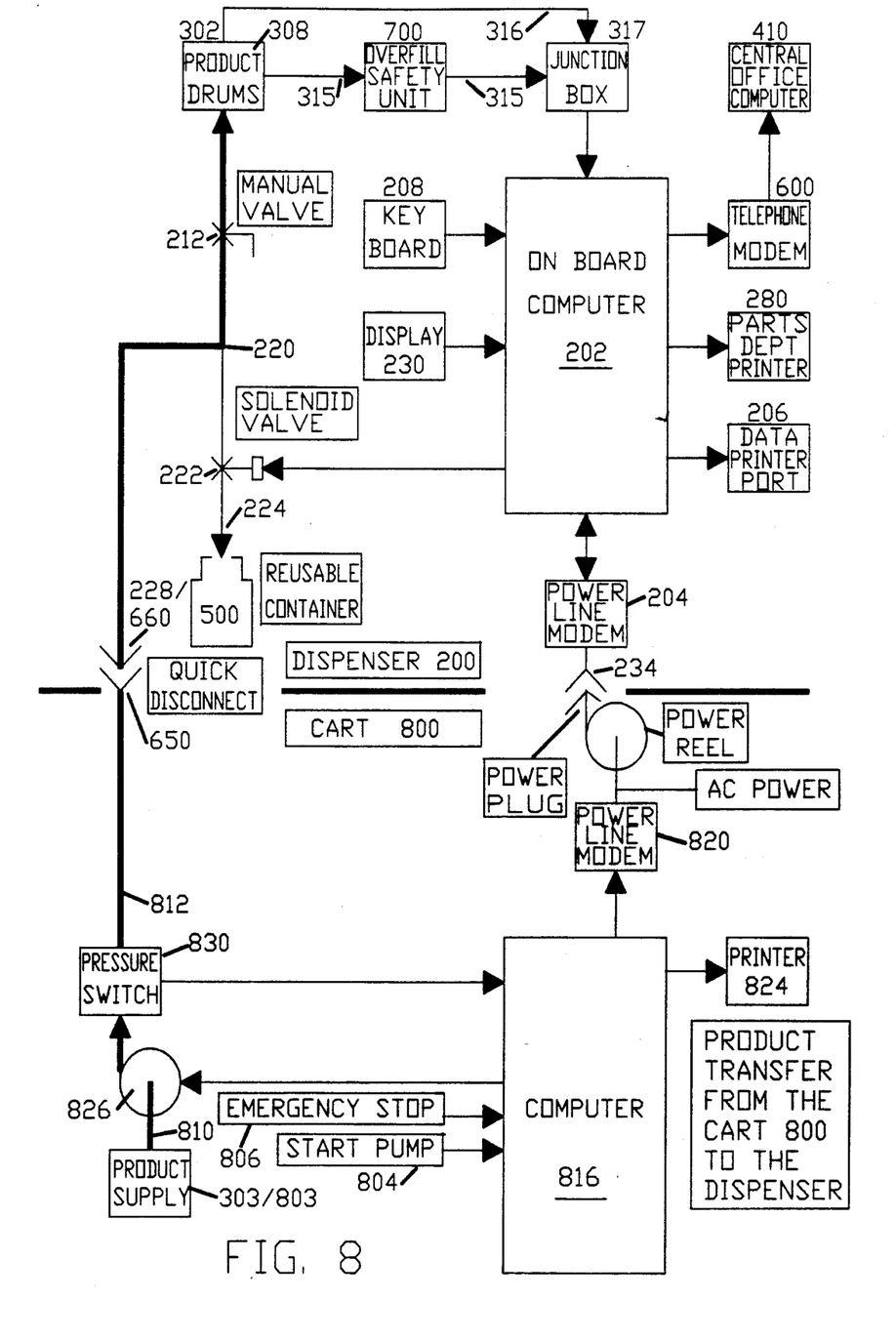
FIG. 8 is a flow chart relating to product flow from the cart of FIG. 7 to site storage.

During startup operations, say for example in a new city or in an area with a small number of customers, an alternate transfer vehicle (ATV) of much smaller size than the herein discussed vehicle 100 is used. It is also a very valuable adjunct for delivery to customers in close industrial settings or those well outside of metropolitan areas. The alternate transfer vehicle contains a portable dispensing cart 800 which is illustrated in FIG. 7 with attendant flow chart depicted in FIG. 8. The product is stored in five gallon portable containers 303/803. The cart contains transfer pumps and pump control logic/computer 816, similar to that contained in the vehicle subsystem 100. The example given hereinafter is in reference to a five pump 826 system, essentially as shown in FIG. 7. The cart is approximately five feet long by two feet wide by three feet high and rolls about on four casters 802. There are five start/stop pump control pushbuttons 804 that are used to control individual pumps with the master stop button 806 proximate the power cord 808 and readily accessible for emergency pump stoppage. As with the major subsystems, an "emergency stop" activation shuts down all pumps on the cart. The back of the cart is straight, whereas the front is slanted slightly so that when a product container is placed on the base shelf of the cart (not shown) the container tips backward onto the cart. This slight angle ensures that the product will run to the back of the container where a down pipe 810 to the suction side of the pump will completely drain the container.

The base of the cart on which the containers reside is a drip tray having a wire screen on the top and a drain in the bottom thereof to remove any spillage. Each pump is capable of pumping several products. Intermixing is minimized, however, to the maximum extent possible. On the suction side of a discrete pump is a hose and a down pipe 810 that is inserted into a five gallon product container. On the discharge side of the pump is a fill hose 812 fitted with a female quick disconnect 650 that mates with the male disconnect 228/660 on the dispenser 200. These quick disconnects are keyed with the same feature previously discussed. A container identification scheme employed by the instant inventor consists in a series of external and optical or magnetic readable indicia. This identification scheme is used in order to avoid inadvertent mixing of product or placement of improper products on a particular cart. Sensors for reading the optical/magnetic code of product containers (portable) are presently used for connection to the electronic logic within the cart. Thus, the entire logic and pumping system can be enabled only when a product of the correct grouping is in its correct position on the cart. The control logic within the cart reads the level data from the dispenser to determine when a dispenser storage drum 302 is full and disables the particular transfer pump within the cart. A flow sensor 830 in the discharge line of the transfer pump senses when the supply five gallon container is empty and disables the pump after predeterminable delay. Shutting down the pump prevents pumping air into the dispenser, thereby losing the siphon effect in supply lines of the storage drums. The delay allows time for the product to be cleared from the pump to the quick disconnect.

Alternate uses of the equipment detailed in the various subsystems may be formulated by other users of the system. Those matters are well addressed by those having ordinary skill having once been apprised of the instant invention in its totality. Users of the system, whether employing the full vehicle subsystem or the ATV subsystem will readily adapt these features to suit their own particular needs. Such employment latitude is commended to the prospective users therefore, constraint being applied only within the scope of the appended claims.

What is claimed is:

1. A system for delivering, storing and dispensing various liquids to an end user comprising:
   a delivery subsystem including a vehicle comprising an onboard O/B computer for managing onloading, storing and offloading the various liquids, inventorying and reporting data relating to said onloading, storing and offloading and for transmitting said data to offboard computing means, said delivery subsystem also including on said vehicle plumbing means, valving means and plural safety switch means, said plumbing means comprising pipes, hoses and tubes for conveying the various liquids into and out of a drum bank that is used for said storing, said valving means including valves for directing the liquids during said onloading, storing and offloading, said valves responsive to signals from said O/B computer, said plural safety switch means comprising a storage unit overflow detection means and at least one float switch means disposed within a container for communicating an overflow or full-level indication to said O/B computer, said plumbing means also including at least one pump means controlled by said O/B computer and responsive to a driving force comprising compressed gaseous fluid, wherein said O/B computer is controlled by an operator to accept onloading of the fluids from a supply source through at least one quick-disconnect fitting of a vehicle plumbing inlet, said quick-disconnect fitting comprising a hole-coded, male nipple means and a corresponding pin-coded, female receptacle means, said onloading providing suitable fluid inventory recorded by said computer and amenable to hard copy printout by an O/B computer peripheral printer;

a site storage subsystem located at a customer facility and comprising a containment elevated above a liquid dispensing point, a plurality of containers residing within said containment, plural safety switch means including at least one said float switch disposed in each said container and at least one said storage unit overflow detection means having a communicative link with an on-site computer and ultimate communication, through said on-site computer with said O/B computer, on-site plumbing and valving means responsive to on-site computer control; and at least one dispenser subsystem comprising the on-site plumbing and valving means necessary to receive delivery of liquids from said delivery subsystem and including at least one said quick disconnect in conjunction and compatibly coded therewith, said dispenser subsystem further comprising a discrete unit with a drip-catch basin means and including a housing, said housing comprising said on-site computer and a control means to coordinate user solicitation and actual dispensing of liquids, a lightable pushbutton to indicate valve enablement, and at least one specified liquid dispensing spout communicative with said site storage subsystem through a valve means that is responsive to activation by said pushbutton, said dispenser discrete unit computer electronically connected to a telephone modem and, during replenishment of said storage subsystem, through a power modem to said O/B computer, whereby a user identifies him/herself, selects a product to be dispensed in desired quantity, is recognized and accommodated by said on-site computer and control means which lights a pushbutton to allow the user to command actuation of a valve controlling a specific liquid dispensation from said storage subsystem, which command will, through said control means, result in said specific liquid dispensation through said spout, all while said on-site computer maintains inventory and safety controls thereover.

2. The dispenser subsystem of claim 1 wherein said control means is a dispenser control department intercom and is used to identify a user so that personnel of said department may activate said dispenser through said on-site computer.

3. The dispenser subsystem of claim 1 wherein said control means is said on-site computer including keyboard and display operating under a programed protocol of identification with selective valve and pushbutton activations.

4. A system for delivering, storing and dispensing various liquids to an end user comprising:

a delivery subsystem comprising a vehicle with an O/B computer, plumbing means, valving means and plural safety switch means with said plumbing means comprising pipes, hoses and tubes that are connected discretely to offboard pipes, hoses and tubes by pin/hole coded quick-disconnect means to avoid ambiguity of connections, said O/B computer capable of communication with offboard computing means through suitable electrical connections, said plumbing means also containing air-operated valves which derive operating air pressure from offboard compressed air source means wherein, under control of an operator, said O/B computer may receive specific liquid product onto said vehicle for direction, inventory and controlled storage thereonboard;

a site storage subsystem physically located at an elevation above points of dispensation of liquids contained therein, said site storage subsystem containing bulk containers provided with plural safety switch means and susceptible of control by an on-site computer; and a dispenser subsystem unit comprising plumbing means and valving means necessary to receive liquids therethrough and direct delivery thereof to said site storage subsystem and for ultimate receipt therethrough and dispensation of said liquids to users, at least one said quick disconnect communicative and compatible with an off-the-site liquid source and said site storage subsystem, a catch basin means, said on-site computer for controlling identification of users and inventory of products stored/used on the site, said computer containing read-out display means, keyboard means, pushbutton-valve actuation network and peripheral equipment comprising a power modem for hook-up and communication to and with said vehicle delivery subsystem and a telephone means for communication off-site.

5. The invention of claim 4 wherein said dispenser subsystem unit comprises at least one quick-disconnect that is compatible with a delivery subsystem quick-disconnect, contains a computer controlled protocol for transferring liquids from the delivery subsystem to bulk storage and, for liquids so transferred, includes valving and, under suitable control means, transfers the liquids out of bulk storage to a dispensing point colocated on said unit.

6. The invention of claim 5 wherein said pin/hole coded quick-disconnect means comprises pin-coded female disconnect means and compatible hole-coded male disconnect means, at least one said female disconnect means located on an uploading hose of said delivery subsystem and at least one downloading hose of said delivery subsystem and at least one male disconnect means compatible with said one female disconnect means located at a delivery port of a site of said dispenser subsystem unit.

7. The invention of claim 5 wherein said telephone means comprises a dispenser subsystem telephone modem connected to said on-site computer and an off-site telephone system.

8. In a system for delivering, storing and dispensing various liquids to an end user and which comprises a vehicle delivery subsystem containing liquid storage means, onload and offload means and an onboard O/B computer means, a site storage subsystem for storing therein various liquids and a site dispenser subsystem unit including computer-controlled site storage delivery and individual liquid dispensation means within the same dispenser subsystem unit, the improvement comprising:

a dispenser subsystem unit comprising at least one quick-disconnect that is compatible with a quick-disconnect of the delivery subsystem, a computer controlled by a program for the purposes of transferring liquids from the delivery subsystem to bulk storage and control means, including valving and pushbutton actuators for further transferring said liquids from said bulk storage, under suitable control means, to a dispensing point colocated on said unit;

said quick-disconnect of said delivery subsystem having coded means for compatible connection with said quick-disconnect of said dispenser subsystem unit in order to avoid mixing of liquid products delivered by said delivery subsystem; and automatic polling means comprising an on-site computer, an off-site computer, modem linking means located on-site and a polling protocol programatically resident in both said computers.

9. A method for effecting delivery, storage and dispensation of various liquids to an end user comprising the steps of:

uploading a vehicle delivery subsystem with a plurality of liquids;

transporting via the vehicle subsystem said liquids to a customer site;

downloading said liquids from said vehicle subsystem through a plurality of hoses equipped with coded quick disconnects in order to avoid the mixing of said liquids and passing said liquids through a dispensing means while storing same on the site;

a first providing of data related to the type and quantity of liquids transferred in the preceding steps, said downloading, storing and providing performed by and through a discrete dispensing unit;

dispensing subsequently and on a selective basis any of said plurality of liquids from a storing location through the dispensing unit according to the following protocol:
  a) identifying through identification and control means a user of the dispensing subsystem to receive one or more of said liquids;
  b) enabling valve means via suitable control means in order to prepare discrete plumbing to conduct a selected liquid(s);
  c) visually indicating to the user the aforesaid enabling;
  d) actuating visible indication means in order to commence dispensing of said liquid; and
  e) a second providing of data relating to said dispensing step.

* * * * *